United States Patent
Chen

(10) Patent No.: US 11,406,215 B2
(45) Date of Patent: Aug. 9, 2022

(54) ELECTRIC COOKING POT

(71) Applicant: Hsien-Chen Chen, New Taipei (TW)

(72) Inventor: Hsien-Chen Chen, New Taipei (TW)

(*) Notice: Subject to any disclaimer, the term of this patent is extended or adjusted under 35 U.S.C. 154(b) by 389 days.

(21) Appl. No.: 16/657,591

(22) Filed: Oct. 18, 2019

(65) Prior Publication Data
US 2021/0113009 A1  Apr. 22, 2021

(51) Int. Cl.
*A47J 27/12* (2006.01)
*A47J 27/00* (2006.01)

(52) U.S. Cl.
CPC ............. *A47J 27/12* (2013.01); *A47J 27/002* (2013.01); *A47J 27/004* (2013.01)

(58) Field of Classification Search
CPC ........ A47J 27/12; A47J 27/002; A47J 27/004; A47J 27/04; A47J 43/0772; A47J 2027/043; H05B 6/065; H05B 6/08; H05B 6/1272; H05B 6/12
USPC ....... 219/387, 395, 399, 403, 429, 438, 620, 219/621, 622, 624, 663
See application file for complete search history.

(56) References Cited

U.S. PATENT DOCUMENTS

| | | | | |
|---|---|---|---|---|
| 2013/0334197 A1* | 12/2013 | Kim | ............... | F24C 7/067 219/395 |
| 2014/0339220 A1* | 11/2014 | Metz | ............... | H05B 6/1209 219/621 |
| 2016/0381735 A1* | 12/2016 | Christiansen | ......... | H05B 6/065 219/620 |
| 2019/0142205 A1* | 5/2019 | Kopiness | ............. | A47J 27/004 219/438 |

* cited by examiner

*Primary Examiner* — Phuong T Nguyen
(74) *Attorney, Agent, or Firm* — WPAT, PC

(57) ABSTRACT

An electric cooking pot has a main body, a pot body, two electric heating elements and two knobs. The pot body is mounted on a top of the main body. Two cooking recesses are formed on the pot body. The two electric heating elements with different heating powers are attached to the two cooking recesses respectively. One of the heating elements is strip-shaped and substantially forms a quadrilateral to avoid underheat near edges of the corresponding cooking recess. The knobs protrude from the main body. The two heating elements are respectively controlled by the two knobs. The two cooking recesses and a center of the knobs are arranged along a straight line for ease of use. A length of a contour of the main body reduces gradually from bottom to top of the main body. Therefore, users can enjoy two freshly prepared dishes at same time.

8 Claims, 6 Drawing Sheets

ELECTRIC COOKING POT

BACKGROUND OF THE INVENTION

1. Field of the Invention

The present invention relates to cookware, especially to an electric cooking pot that can be used for pan-frying and soup making.

2. Description of the Prior Arts

A conventional electric cooking pot has a main body, an electric heating element and a pot body. The pot body has an inner space and is mounted on top of the main body. The electric heating element is attached to the bottom of the pot body and provides heat for cooking. Different food ingredients can be placed into the pot body. During cooking, food ingredients are cooked inside the pot body, and the electric cooking pot can be used for several kinds of cooking methods, such as pan-frying and soup making.

However, the conventional electric cooking pot cannot be used for pan-frying and soup making simultaneously. When a user prefers to have one pan-fried dish and one soup at the same time, the foods can only be made one by one, and the user needs to wait until both dishes are prepared before starting to eat. However, the first-prepared dish loses its flavor due to temperature drop when waiting for the second dish, and it also takes too much time for cooking.

To overcome the shortcomings, the present invention provides an electric cooking pot to mitigate or obviate the aforementioned problems.

SUMMARY OF THE INVENTION

The main objective of the present invention is to provide an electric cooking pot that can be used for cooking two dishes simultaneously.

The electric cooking pot has a main body, a pot body, two electric heating elements and a control module. The pot body is mounted on a top of the main body. A first cooking recess and a second cooking recess are formed on the pot body and do not communicate with each other. The first cooking recess is shallower than the second cooking recess. The electric heating elements are mounted in the main body, and are attached to the pot body. The two electric heating elements are located under the two first and second cooking recesses respectively. Heating powers of the two electric heating elements are different. The control module is mounted in the main body and electrically connected to the two electric heating elements. The control module has a manual operating part protruding from the main body. The first cooking recess, the second cooking recess, and the manual operating part are arranged along an imaginary operating line, and the operating line is a straight line.

The advantage of the present invention is that the pot body has two cooking recesses, and two electric heating elements are located below the two cooking recesses respectively. Therefore, two different dishes can be cooked using the two cooking recesses respectively at the same time. Moreover, heating powers of the two electric heating elements are different, which allows the user to use one cooking recess for cooking dishes that require higher heating power, such as a personal fondue, and use the other cooking recess for cooking dishes that require lower heating power, such as pan-fried sliced meat. As a result, the user not only enjoys two freshly prepared dishes at the same time, but also saves time spent on cooking. Additionally, the two cooking recesses and the manual operating part of the control module are arranged along a straight line for ease of use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
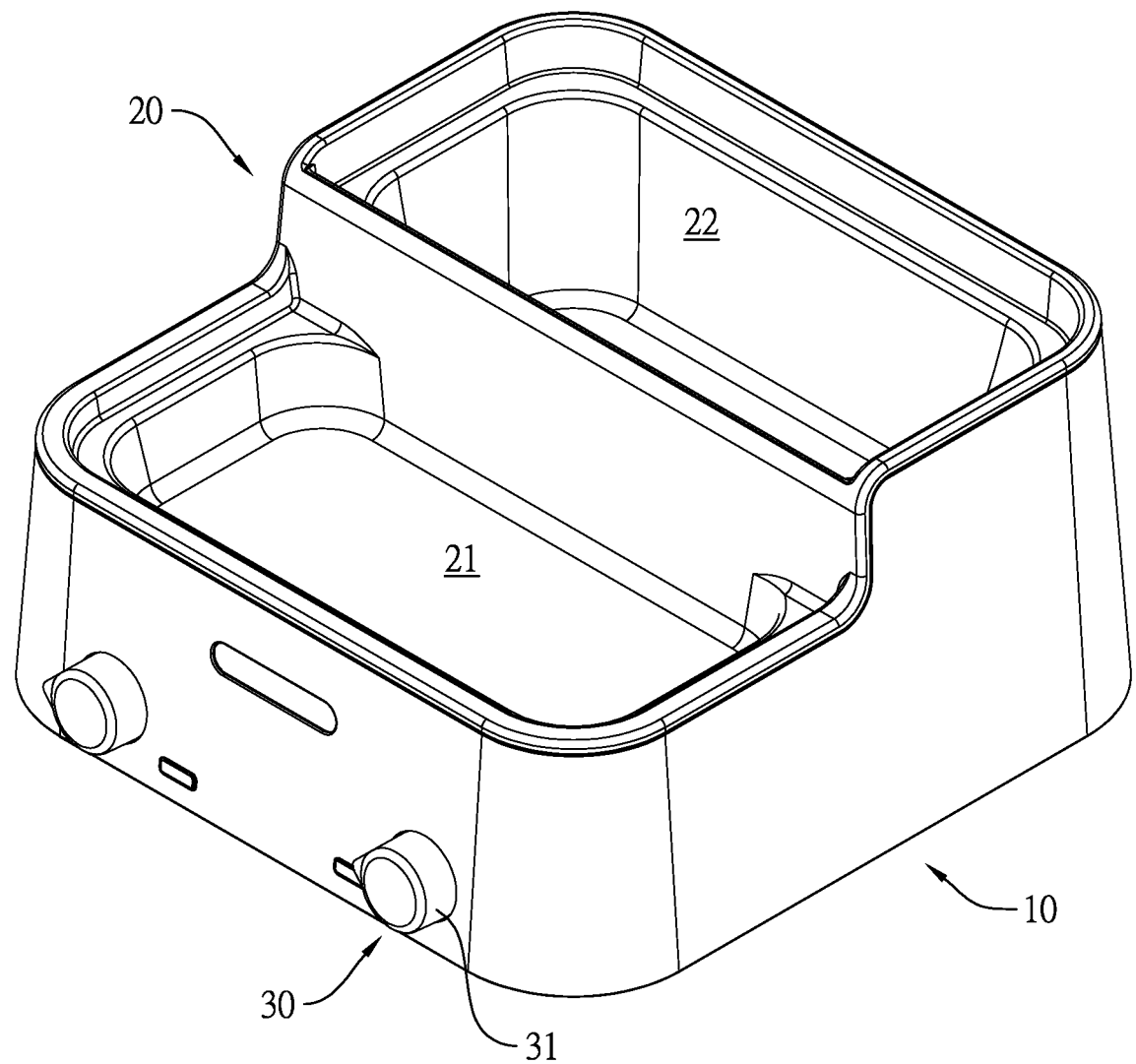
FIG. 1 is a perspective view of an electric cooking pot in accordance with the present invention.
Figure 2:
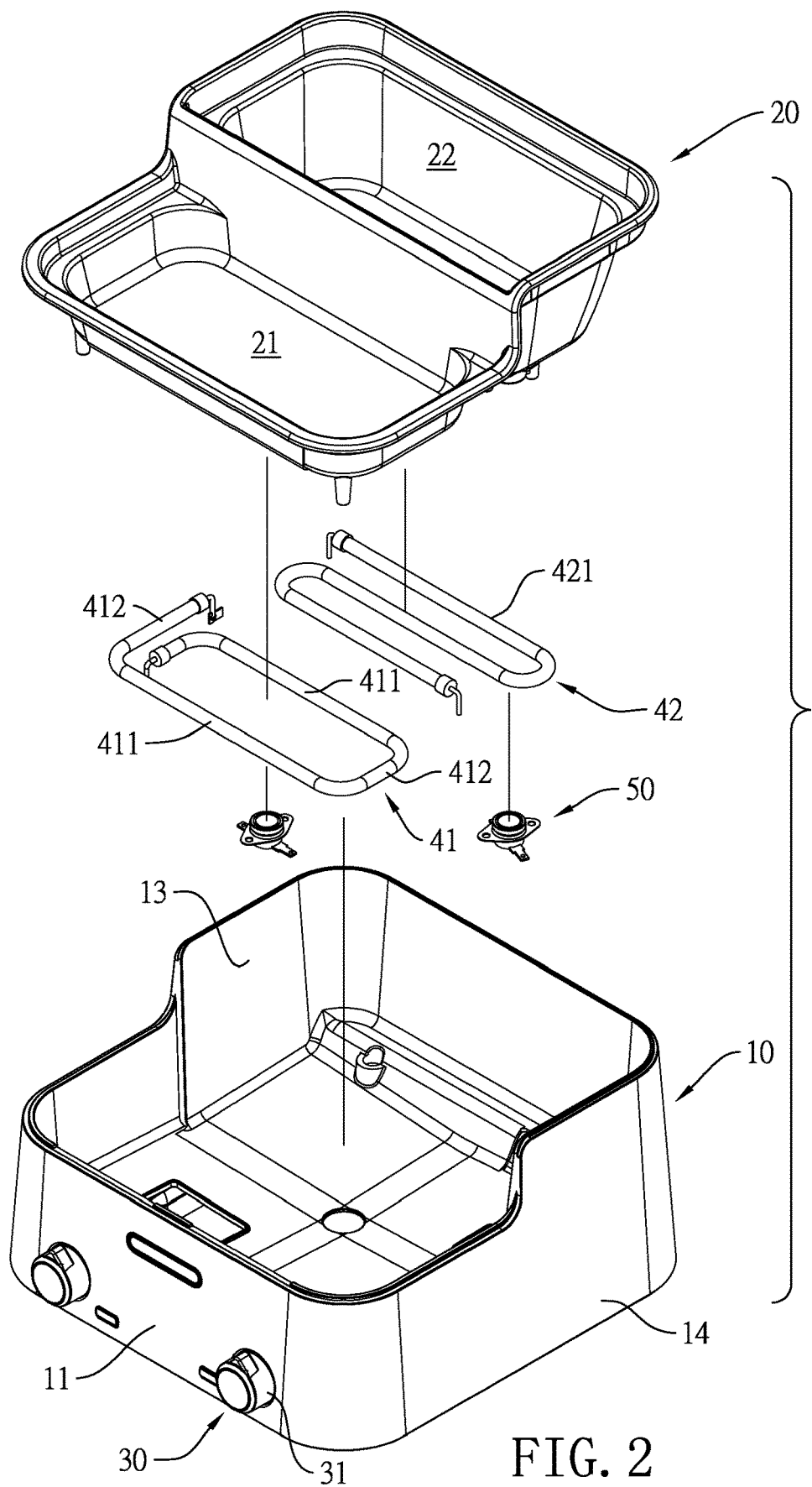
FIG. 2 is an exploded perspective view of the electric cooking pot in FIG. 1.

With reference to FIGS. 1 and 2, an electric cooking pot in accordance with the present invention comprises a main body 10, a pot body 20, a control module 30 and two electric heating elements. In a preferred embodiment, the electric cooking pot further comprises two overheat sensors 50.

Figure 5:
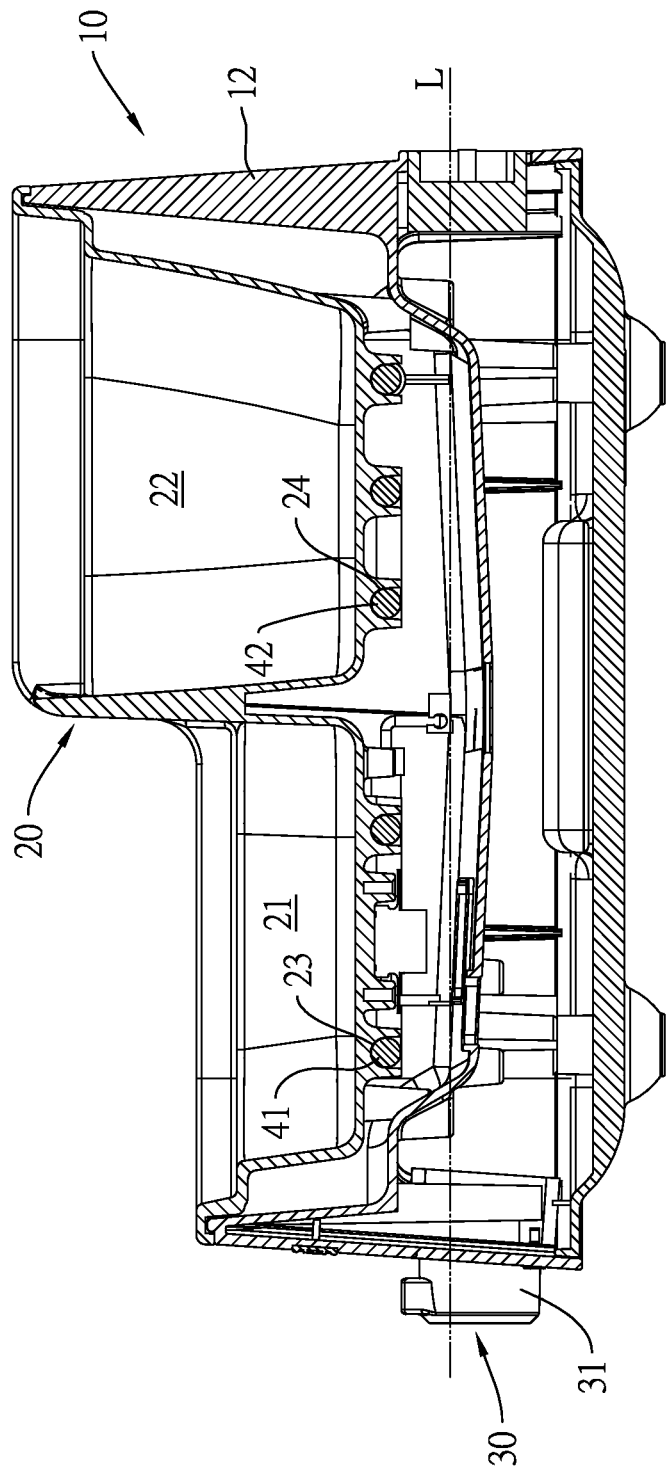
FIG. 5 is a cross sectional view of the electric cooking pot in FIG. 1.
Figure 6:
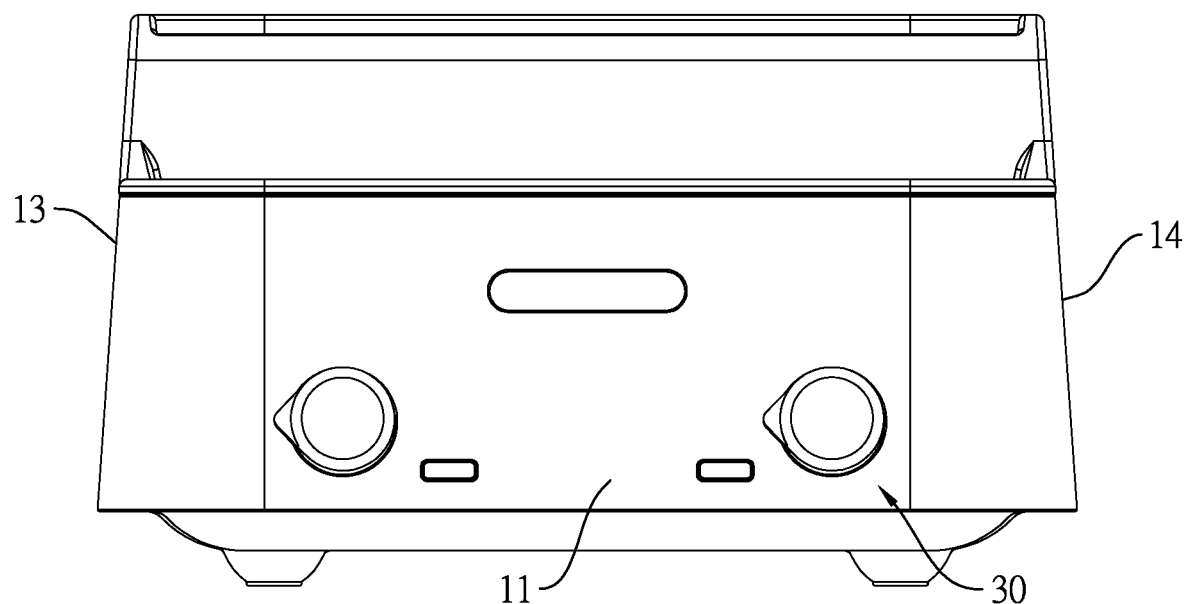
FIG. 6 is a side view of the electric cooking pot in FIG. 1.

With further reference to FIGS. 2, 5 and 6, the main body 10 is a casing with a square cross section, and four lateral surfaces of the main body 10 incline toward a center of the main body 10, such that a length of a contour of the main body 10 reduces gradually from a bottom of the main body 10 to a top of the main body 10. Heat inside the main body 10 can be concentrated on the top of the main body 10, which improves the cooking efficiency. To be precise, the main body 10 has a front wall 11, a rear wall 12, a left side wall 13 and a right side wall 14. The front wall 11 and the rear wall 12 are located on two opposite sides of the main body 10 respectively and incline toward each other. The left side wall 13 and the right side wall 14 are located on the two opposite sides of the main body 10 respectively and incline toward each other. An imaginary line connecting the front wall 11 and the rear wall 12 is perpendicular to an imaginary line connecting the left side wall 13 and the right side wall 14.

With further reference to FIGS. 1, 2 and 5, the pot body 20 is mounted on top of the main body 10. A first cooking recess 21 and a second cooking recess 22 are formed on the pot body 20. In a preferred embodiment, a depth of the first cooking recess 21 is shallower than that of the second cooking recess 22 and is suitable for pan-frying or grilling. The depth of the second cooking recess 22 is relatively deeper, and is suitable for cooking personal fondue or boiling soup.

The control module 30 is mounted in the main body 10, and has a manual operating part 31. The manual operating part 31 protrude from the main body 10, and to be precise, the manual operating part 31 has two knobs. The manual operating part 31, the first cooking recess 21 and the second cooking recess 22 are arranged along a straight operating line L for ease of use. In a preferred embodiment, a center of the two knobs of the manual operating part 31, the first cooking recess 21 and the second cooking recess 22 are arranged along a straight operating line L.

In a preferred embodiment, the first cooking recess 21 and the second cooking recess 22 are oblong recesses extending along a length direction, which is suitable for accommodating strip-shaped food ingredients such as sliced meat. The length direction is perpendicular to the operating line L for ease of use.

Figure 3:
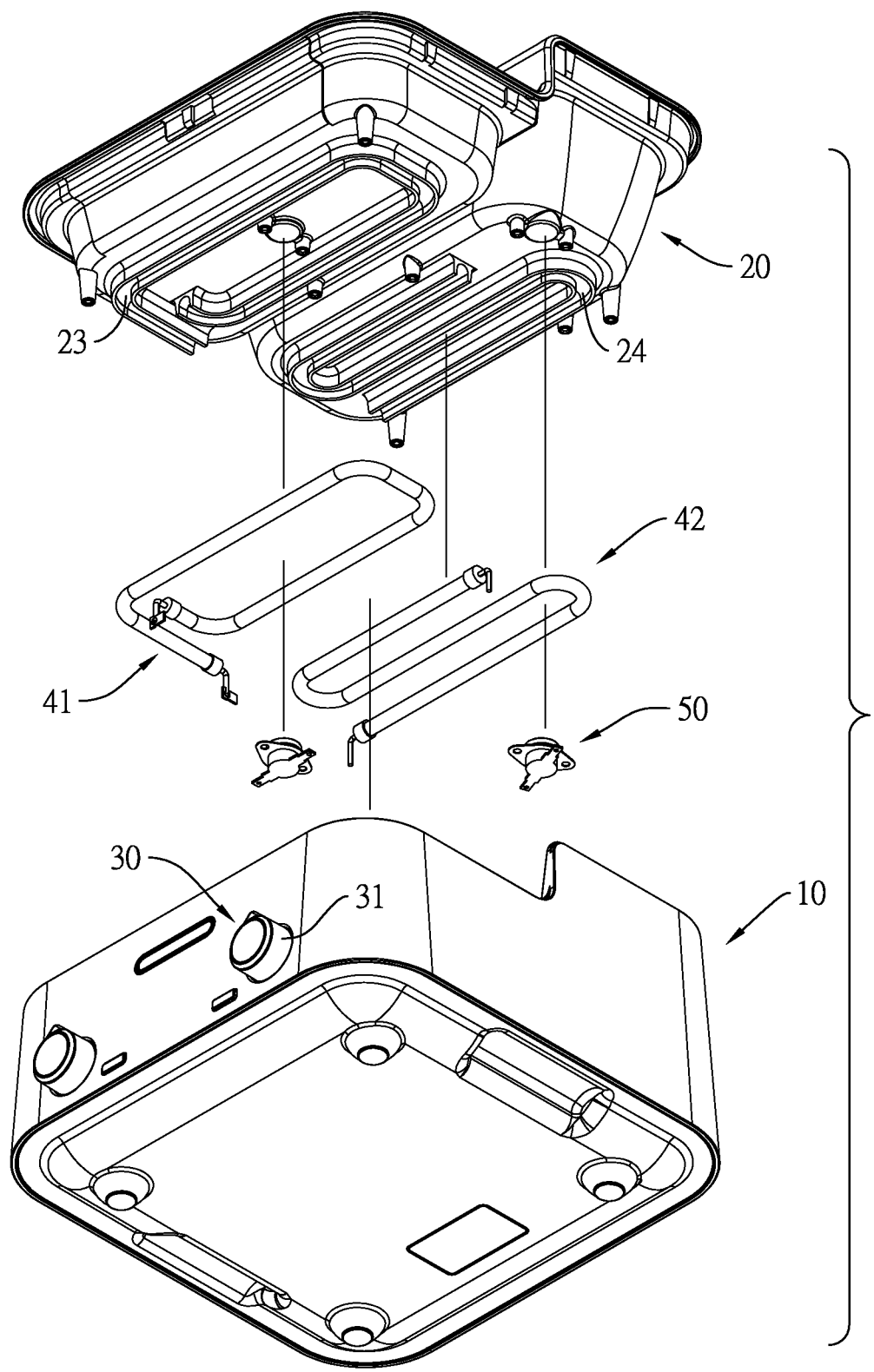
FIG. 3 is another exploded perspective view of the electric cooking pot in FIG. 1.
Figure 4:
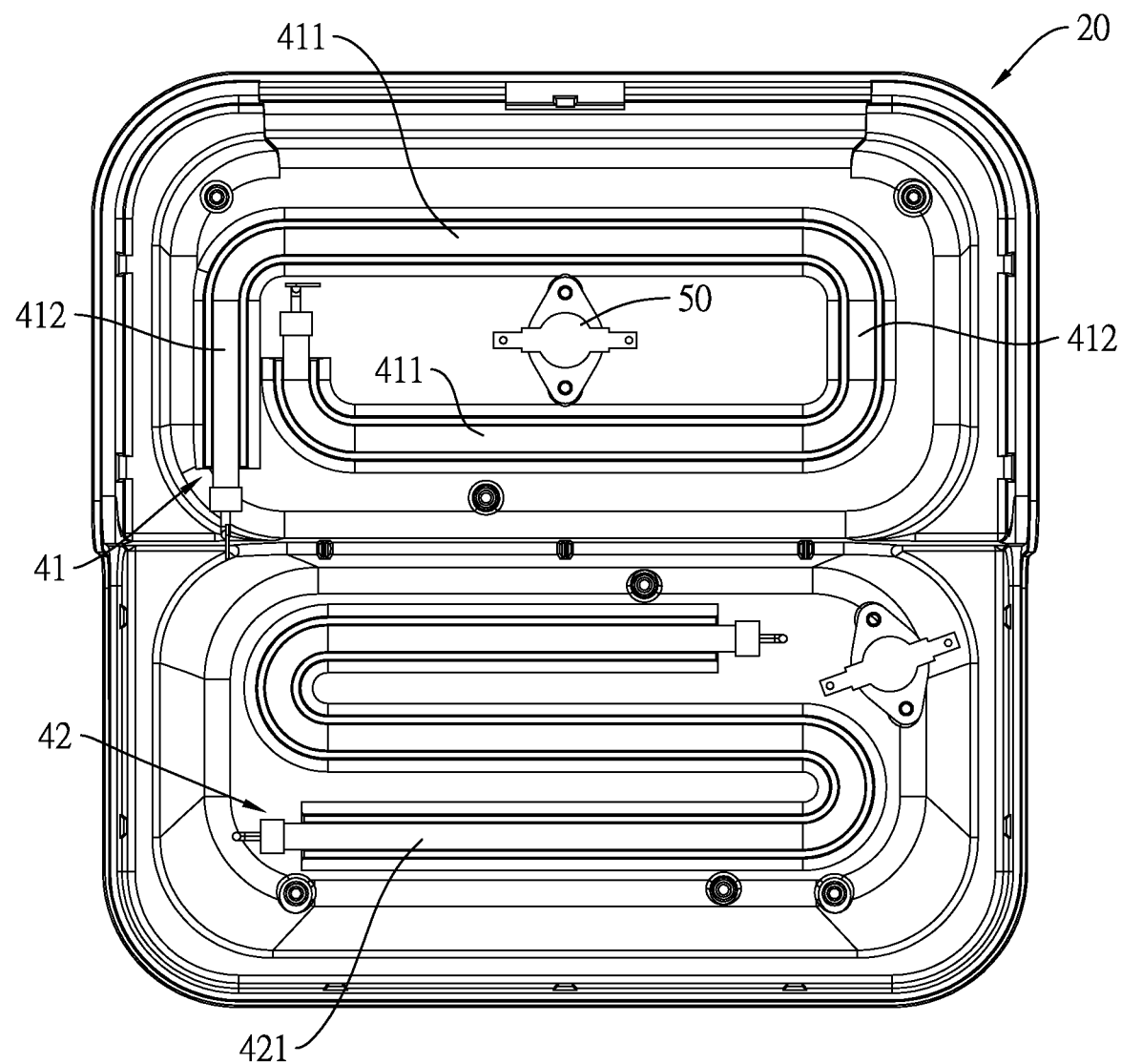
FIG. 4 is a bottom view of part of the components of the electric cooking pot in FIG. 1.

With further reference to FIGS. 3 to 5, the electric heating elements are mounted in the main body 10 and attached to the pot body 20. The two electric heating elements are respectively located under the first cooking recess 21 and the second cooking recess 22. Heating powers of the two electric heating elements are different, which allows a user to cook two dishes that require different heating powers at the same time. The electric heating elements are electrically connected to the control module 30 so that the user can control the electric heating elements. To be precise, the two heating elements are respectively controlled by the two knobs of the manual operating part 31. However, the number of the knob can be one.

In a preferred embodiment, the two electric heating elements are respectively a first electric heating element 41 and a second electric heating element 42. The first electric heating element 41 and the second electric heating element 42 are located under the first cooking recess 21 and the second cooking recess 22 respectively. Each electric heating element is an electric heating tube in the shape of a strip. The length of the second electric heating element 42 is greater than the length of the first electric heating element 41, so that the second cooking recess 22 has higher heating power than the first cooking recess 21.

Concerning the specific shape of the first electric heating element 41, in a preferred embodiment, the strip-shaped first electric heating element 41 substantially forms a quadrilateral. The first electric heating element 41 has two first straight sections 411 and two second straight sections 412. The first straight sections 411 extend along the length direction of the first cooking recess 21, and are disposed apart from each other in order to distribute heating power uniformly across the bottom of the first cooking recess 21. The two second straight sections 412 extend along a direction that is perpendicular to the first cooking recess 21, i.e., the operating line L. The two second straight sections 412 are attached to a bottom surface of the first cooking recess 21, and are located adjacent to two opposite edges of said bottom surface respectively, wherein said two opposite edges are arranged along the length direction of the first cooking recess 21. The two second straight sections 412 enhance the heating power near said edges and avoid underheat near said edges.

Concerning the specific shape of the second electric heating element 42, in a preferred embodiment, the strip-shaped second electric heating element 42 substantially forms an S curve. The second electric heating element 42 has three first straight sections 421. The first straight sections 421 extend along the length direction of the second cooking recess 22, and are disposed apart from each other. In a preferred embodiment, a distance between two adjacent first straight sections 421 of the second electric heating elements 42 is shorter than a distance between two adjacent first straight sections 411 of the first electric heating elements 41, so that the heating power of the second cooking recess 22 is larger than the heating power of the cooking recess 21.

In a preferred embodiment, a first engaging recess 23 and a second engaging recess 24 are formed in the bottom of the pot body 20. The first engaging recess 23 and the second engaging recess 24 are located under the first cooking recess 21 and the second cooking recess 22 respectively. The first electric heating element 41 and the second electric heating element 42 are engaged in the first engaging recess 23 and the second engaging recess 24 respectively to enlarge the contact area between the heating elements and the pot body 20, which in turn improves the heating efficiency.

The two overheat sensors 50 are attached to the bottom of the pot body 20 and electrically connected to the control module 30. The overheat sensors 50 forcefully disconnect the power of the heating element when temperature of the first cooking recess 21 or the second cooking recess 22 is too high. Heat-generated damage is prevented by the overheat sensors 50. However, the number of the second cooking recess 22 is not limited to two, and there can be only one overheat sensor 50.

In summary, two cooking recesses are formed on the pot body. The two cooking recesses are heated up by two electric heating elements with different heating powers. Therefore, two different dishes can be cooked using the two cooking recesses respectively at the same time. The two cooking recesses and the manual operating part of the control module are arranged along a straight line for ease of use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electric cooking pot comprising:
   a main body;
   a pot body mounted on a top of the main body, and having a first cooking recess and a second cooking recess formed on the pot body and separating from each other, wherein the first cooking recess is shallower than the second cooking recess;
   two electric heating elements mounted in the main body, attached to the pot body, and located under the first and second cooking recesses respectively; heating powers of the two electric heating elements being different; and
   a control module mounted in the main body and electrically connected to the two electric heating elements, having a manual operating part protruding from the main body;
   wherein the first cooking recess, the second cooking recess, and the manual operating part are arranged along an operating line, and the operating line being a straight line; and
   wherein each one of the electric heating elements is an electric heating tube in the shape of a strip, and lengths of the two electric heating elements are different.

2. The electric cooking pot as claimed in claim 1, wherein the first cooking recess and the second cooking recess extend along a length direction; the length direction is perpendicular to the operating line;
   each one of the electric heating elements has multiple first straight sections; the first straight sections extend along the length direction, and the first straight sections are spaced apart from each other.

3. The electric cooking pot as claimed in claim 2, wherein one of the electric heating elements has two second straight sections; the two second straight sections extend along the operating line, and are respectively located adjacent to two opposite edges, which are arranged along the length direction, of a bottom surface of the first cooking recess.

4. The electric cooking pot as claimed in claim 2, wherein the two electric heating elements are respectively a first electric heating element and a second electric heating element; the second electric heating element is longer than the first electric heating element in length; a distance between two adjacent ones of the first straight sections of the second electric heating element is shorter than a distance between two adjacent ones of the first straight sections of the first electric heating element.

5. The electric cooking pot as claimed in claim 1, wherein two engaging recesses are formed in a bottom of the pot body and located under the first cooking recess and the second cooking recess respectively; and the two electric heating elements engage in the two engaging recesses respectively.

6. The electric cooking pot as claimed in claim 1, wherein the electric cooking pot further has at least one overheat sensor attached to the pot body and electrically connected to the control module.

7. The electric cooking pot as claimed in claim 1, wherein a length of a contour of the main body reduces gradually from a bottom of the main body to the top of the main body.

8. The electric cooking pot as claimed in claim 1, wherein the main body has a front wall and a rear wall located on two opposite sides of the main body respectively and inclining toward each other; and a left side wall and a right side wall located on two opposite sides of the main body respectively and inclining toward each other; wherein an imaginary line connecting the front wall and the rear wall is perpendicular to an imaginary line connecting the left side wall and the right side wall.

* * * * *